(12) United States Patent
Wolf et al.

(10) Patent No.: US 11,171,963 B2
(45) Date of Patent: *Nov. 9, 2021

(54) SYSTEM FOR AUTHENTICATION OF A USER BASED ON MULTI-FACTOR PASSIVELY ACQUIRED DATA

(71) Applicant: Bank of America Corporation, Charlotte, NC (US)

(72) Inventors: Jon Robert Wolf, Charlotte, NC (US); Charles R. Liu, San Francisco, CA (US); Dianna Letourneau O'Neill, Charlotte, NC (US); Matthew Edward Williams, Frisco, TX (US); Bryan Lee Card, Thousand Oaks, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 192 days.

This patent is subject to a terminal disclaimer.

(21) Appl. No.: 16/775,575

(22) Filed: Jan. 29, 2020

(65) Prior Publication Data

US 2020/0169566 A1 May 28, 2020

Related U.S. Application Data

(63) Continuation of application No. 15/628,088, filed on Jun. 20, 2017, now Pat. No. 10,574,662.

(51) Int. Cl.
*H04L 29/06* (2006.01)
*G06F 21/31* (2013.01)

(52) U.S. Cl.
CPC ............ *H04L 63/102* (2013.01); *G06F 21/31* (2013.01); *H04L 63/08* (2013.01); *H04L 63/083* (2013.01);

(Continued)

(58) Field of Classification Search
CPC ... H04L 63/102; H04L 63/08; H04L 63/0861; H04L 2463/082
See application file for complete search history.

(56) References Cited

U.S. PATENT DOCUMENTS

| 4,650,929 A | 3/1987 | Boerger et al. |
| 5,581,630 A | 12/1996 | Bonneau, Jr. |

(Continued)

FOREIGN PATENT DOCUMENTS

| KR | 20080023900 | 3/2008 |
| KR | 20090050383 | 5/2009 |

OTHER PUBLICATIONS

Schilling et al., "Secured Miniaturized System-in-Package Contactless and Passive Authentication Devices Featuring NFC," 2016 Euromicro Conference on Digital System Design (DSD) Year: 2016 | Conference Paper | Publisher: IEEE.*

(Continued)

*Primary Examiner* — Roderick Tolentino
(74) *Attorney, Agent, or Firm* — Michael A. Springs; Moore & Van Allen PLLC; Seongun M. Hong

(57) ABSTRACT

A multi-factored authentication system is provided to identify users. Accordingly, the authentication system may utilize a combination of multiple authentication methods to identify and authenticate a user, such as facial recognition, voice recognition, fingerprint/retinal recognition, detection of cards/chips or smartphones located with the user, PINs, passwords, cryptographic keys, tokens, and the like. The various authentication methods may be used to calculate a confidence value for the authentication system, where the confidence value reflects the degree of certainty of the user's identity. Each authentication method may, upon identifying a positive match for a user, increase the confidence value by a certain degree.

18 Claims, 6 Drawing Sheets

(52) U.S. Cl.
CPC ...... *H04L 63/0823* (2013.01); *H04L 63/0861* (2013.01); *H04L 2463/082* (2013.01)

(56) References Cited

U.S. PATENT DOCUMENTS

| | | | |
|---|---|---|---|
| 5,604,341 A | 2/1997 | Grossi et al. |
| 5,774,663 A | 6/1998 | Randle et al. |
| 5,825,869 A | 10/1998 | Brooks et al. |
| 5,943,055 A | 8/1999 | Sylvan |
| 5,991,749 A | 11/1999 | Morrill, Jr. |
| 6,223,983 B1 | 5/2001 | Kjonaas et al. |
| 6,301,354 B1 | 10/2001 | Walker et al. |
| 6,430,174 B1 | 8/2002 | Jennings et al. |
| 6,513,015 B2 | 1/2003 | Ogasawara |
| 6,654,032 B1 | 11/2003 | Zhu et al. |
| 6,738,628 B1 | 5/2004 | McCall et al. |
| 6,820,260 B1 | 11/2004 | Flockhart et al. |
| 6,845,155 B2 | 1/2005 | Elsey |
| 6,845,361 B1 | 1/2005 | Dowling |
| 6,847,714 B2 | 1/2005 | Das et al. |
| 7,047,560 B2 | 5/2006 | Fishman et al. |
| 7,111,174 B2 | 9/2006 | Hamid |
| 7,149,533 B2 | 12/2006 | Laird et al. |
| 7,167,182 B2 | 1/2007 | Butler |
| 7,372,952 B1 | 5/2008 | Wu et al. |
| 7,536,316 B2 | 5/2009 | Ozer et al. |
| 7,536,722 B1 | 5/2009 | Saltz et al. |
| 7,543,738 B1 | 6/2009 | Saunders et al. |
| 7,679,636 B1 | 3/2010 | Beck et al. |
| 7,712,657 B1 | 5/2010 | Block et al. |
| 7,742,584 B2 | 6/2010 | Chatterjee et al. |
| 7,774,076 B2 | 8/2010 | Skowronek |
| 7,814,016 B2 | 10/2010 | Pranger |
| 7,857,212 B1 | 12/2010 | Matthews |
| 7,869,583 B2 | 1/2011 | Mandalia et al. |
| 7,904,718 B2 | 3/2011 | Giobbi et al. |
| 7,911,334 B2 | 3/2011 | Busey |
| 7,912,843 B2 | 3/2011 | Murdock et al. |
| 7,979,899 B2 | 7/2011 | Guo et al. |
| 8,009,013 B1 | 8/2011 | Hirschfeld et al. |
| 8,055,551 B2 | 11/2011 | Milgramm et al. |
| 8,073,460 B1 | 12/2011 | Scofield et al. |
| 8,091,778 B1 | 1/2012 | Block et al. |
| 8,145,649 B2 | 3/2012 | Murdock et al. |
| 8,184,070 B1 | 5/2012 | Taubman |
| 8,186,578 B1 | 5/2012 | Block et al. |
| 8,201,729 B1 | 6/2012 | Block et al. |
| 8,229,787 B2 | 7/2012 | Ramchandani et al. |
| 8,244,638 B2 | 8/2012 | Agarwal et al. |
| 8,255,304 B1 | 8/2012 | Lorenzo |
| 8,259,692 B2 | 9/2012 | Bajko |
| 8,260,707 B2 | 9/2012 | Treadwell et al. |
| 8,279,779 B2 | 10/2012 | Singh et al. |
| 8,295,898 B2 | 10/2012 | Ashfield et al. |
| 8,327,141 B2 | 12/2012 | Vysogorets et al. |
| 8,332,232 B2 | 12/2012 | Nickerson et al. |
| 8,332,329 B1 | 12/2012 | Thiele |
| 8,369,266 B2 | 2/2013 | Jin et al. |
| 8,401,897 B1 | 3/2013 | Chatterjee |
| 8,413,891 B2 | 4/2013 | Long |
| 8,467,768 B2 | 6/2013 | Mahaffey et al. |
| 8,500,031 B2 | 8/2013 | Naelon |
| 8,566,203 B1 | 10/2013 | Vieira et al. |
| 8,572,391 B2 | 10/2013 | Golan et al. |
| 8,583,933 B2 | 11/2013 | Granbery |
| 8,590,028 B2 | 11/2013 | Saxena et al. |
| 8,606,712 B2 | 12/2013 | Choudhuri et al. |
| 8,630,854 B2 | 1/2014 | Marvit |
| 8,666,821 B2 | 3/2014 | Xie et al. |
| 8,671,001 B1 | 3/2014 | Thompson et al. |
| 8,671,444 B2 | 3/2014 | Kulkarni et al. |
| 8,713,454 B2 | 4/2014 | Sriraghavan et al. |
| 8,717,401 B1 | 5/2014 | Gossweiler, III et al. |
| 8,742,894 B2 | 6/2014 | Seydoux |
| 8,751,393 B1 | 6/2014 | Murray et al. |
| 8,819,549 B2 | 8/2014 | Nageswaram et al. |
| 8,864,022 B2 | 10/2014 | Hernandez |
| 8,866,877 B2 | 10/2014 | Calman et al. |
| 8,866,878 B2 | 10/2014 | Calman et al. |
| 8,867,734 B2 | 10/2014 | Calman et al. |
| 8,902,279 B2 | 12/2014 | Calman et al. |
| 8,942,684 B2 | 1/2015 | Calman et al. |
| 9,001,180 B2 | 4/2015 | Calman et al. |
| 9,113,330 B2 | 8/2015 | Lambert |
| 9,183,554 B1 | 11/2015 | Courtright et al. |
| 9,204,257 B1 | 12/2015 | Mendelson |
| 9,215,570 B2 | 12/2015 | Schulz et al. |
| 9,253,320 B2 | 2/2016 | Fan et al. |
| 9,294,476 B1 | 3/2016 | Lurey et al. |
| 9,380,421 B1 | 6/2016 | Vltavsky |
| 9,471,759 B2 | 10/2016 | Jones |
| 9,491,170 B2 | 11/2016 | Pender |
| 9,508,058 B2 | 11/2016 | Calman et al. |
| 9,525,694 B2 | 12/2016 | Pender |
| 9,565,531 B2 | 2/2017 | Jack et al. |
| 9,572,093 B2 | 2/2017 | Moon |
| 9,589,298 B2 | 3/2017 | Pant et al. |
| 9,639,834 B2 | 5/2017 | Syed |
| 9,754,320 B2 | 9/2017 | Calman et al. |
| 9,792,368 B1 | 10/2017 | Amacker et al. |
| 2002/0172347 A1 | 11/2002 | Elsey |
| 2003/0035531 A1 | 2/2003 | Brown et al. |
| 2003/0126075 A1 | 7/2003 | Mascavage, III et al. |
| 2003/0202088 A1 | 10/2003 | Knight |
| 2003/0209599 A1* | 11/2003 | Gatto ............... G06Q 20/10 235/379 |
| 2004/0193441 A1* | 9/2004 | Altieri ............... G06Q 30/02 709/203 |
| 2004/0203677 A1 | 10/2004 | Brown et al. |
| 2005/0080731 A1 | 4/2005 | Dnyaneshwar |
| 2005/0097046 A1 | 5/2005 | Singfield |
| 2005/0100160 A1 | 5/2005 | Bae |
| 2005/0232471 A1 | 10/2005 | Baer |
| 2006/0004660 A1 | 1/2006 | Pranger |
| 2006/0062376 A1 | 3/2006 | Pickford |
| 2006/0119469 A1 | 6/2006 | Hirai et al. |
| 2006/0131389 A1 | 6/2006 | Kwon |
| 2006/0224508 A1 | 10/2006 | Fietz |
| 2006/0226215 A1 | 10/2006 | Yu et al. |
| 2006/0256954 A1 | 11/2006 | Patel et al. |
| 2006/0271450 A1 | 11/2006 | Cohen et al. |
| 2007/0016796 A1 | 1/2007 | Singhal |
| 2007/0033528 A1 | 2/2007 | Merril et al. |
| 2007/0039025 A1 | 2/2007 | Kraft et al. |
| 2007/0186258 A1 | 8/2007 | Dapper et al. |
| 2007/0186261 A1 | 8/2007 | Geile et al. |
| 2007/0192815 A1 | 8/2007 | Geile et al. |
| 2007/0195689 A1 | 8/2007 | Dapper et al. |
| 2007/0195901 A1 | 8/2007 | Geile et al. |
| 2007/0195902 A1 | 8/2007 | Geile et al. |
| 2007/0201573 A1 | 8/2007 | Geile et al. |
| 2007/0206693 A1 | 9/2007 | Geile et al. |
| 2008/0052151 A1 | 2/2008 | Xie et al. |
| 2008/0114697 A1 | 5/2008 | Black et al. |
| 2008/0126116 A1 | 5/2008 | Singhai |
| 2008/0148052 A1 | 6/2008 | Lindsley |
| 2008/0186377 A1 | 8/2008 | Eriksson et al. |
| 2008/0189420 A1 | 8/2008 | Herrod et al. |
| 2008/0209516 A1 | 8/2008 | Nassiri |
| 2008/0309617 A1 | 12/2008 | Kong et al. |
| 2009/0006230 A1 | 1/2009 | Lyda et al. |
| 2009/0016512 A1 | 1/2009 | Bryant et al. |
| 2009/0037339 A1 | 2/2009 | Ancell et al. |
| 2009/0037982 A1 | 2/2009 | Wentker et al. |
| 2009/0061831 A1 | 3/2009 | Shastry |
| 2009/0089683 A1 | 4/2009 | Thapa |
| 2009/0106155 A1 | 4/2009 | Castellanos et al. |
| 2009/0192845 A1 | 7/2009 | Gudipaty et al. |
| 2009/0193342 A1 | 7/2009 | Barthelmess et al. |
| 2009/0200374 A1 | 8/2009 | Jentoft |
| 2009/0252318 A1 | 10/2009 | Smith et al. |
| 2009/0259499 A1 | 10/2009 | Bhojwani et al. |
| 2009/0281887 A1 | 11/2009 | Deakin et al. |
| 2009/0292583 A1 | 11/2009 | Eilam et al. |

(56) References Cited

U.S. PATENT DOCUMENTS

| | | |
|---|---|---|
| 2009/0328052 A1 | 12/2009 | Nguyen et al. |
| 2009/0328182 A1 | 12/2009 | Malakapalli et al. |
| 2010/0017874 A1 | 1/2010 | Piccinini et al. |
| 2010/0024017 A1 | 1/2010 | Ashfield et al. |
| 2010/0042541 A1 | 2/2010 | Kang et al. |
| 2010/0063890 A1 | 3/2010 | Huckleby |
| 2010/0066805 A1 | 3/2010 | Tucker et al. |
| 2010/0082470 A1 | 4/2010 | Walach et al. |
| 2010/0131868 A1 | 5/2010 | Chawla et al. |
| 2010/0174678 A1 | 7/2010 | Massand |
| 2010/0191581 A1 | 7/2010 | Furin et al. |
| 2010/0198725 A1 | 8/2010 | Naccache |
| 2010/0205063 A1 | 8/2010 | Mersky |
| 2010/0274859 A1 | 10/2010 | Bucuk |
| 2010/0277276 A1 | 11/2010 | Bayne et al. |
| 2010/0281129 A1 | 11/2010 | Cha |
| 2010/0287250 A1 | 11/2010 | Carlson et al. |
| 2010/0312700 A1 | 12/2010 | Coulter et al. |
| 2010/0318461 A1 | 12/2010 | Smith et al. |
| 2011/0026114 A1 | 2/2011 | Abe et al. |
| 2011/0035240 A1 | 2/2011 | Joao |
| 2011/0047075 A1 | 2/2011 | Fourez |
| 2011/0086646 A1 | 4/2011 | Gupta et al. |
| 2011/0109715 A1 | 5/2011 | Jing et al. |
| 2011/0131128 A1 | 6/2011 | Vaananen |
| 2011/0166869 A1 | 7/2011 | Froelich et al. |
| 2011/0167123 A1 | 7/2011 | Coskun et al. |
| 2011/0202377 A1 | 8/2011 | Maiya et al. |
| 2011/0206198 A1 | 8/2011 | Freedman et al. |
| 2011/0208657 A1 | 8/2011 | Rao |
| 2011/0244439 A1* | 10/2011 | Reed .............. G09B 7/04 434/350 |
| 2011/0246306 A1 | 10/2011 | Blackhurst et al. |
| 2011/0246317 A1 | 10/2011 | Coppinger |
| 2011/0249081 A1 | 10/2011 | Kay et al. |
| 2011/0251892 A1 | 10/2011 | Laracey |
| 2011/0261947 A1 | 10/2011 | Benefield et al. |
| 2011/0271209 A1 | 11/2011 | Jones et al. |
| 2011/0279638 A1 | 11/2011 | Periyannan et al. |
| 2011/0302503 A1 | 12/2011 | Cahill et al. |
| 2011/0313804 A1 | 12/2011 | Camp et al. |
| 2011/0321031 A1 | 12/2011 | Dournov et al. |
| 2012/0004769 A1 | 1/2012 | Hallenbeck et al. |
| 2012/0005599 A1 | 1/2012 | Bastide et al. |
| 2012/0030043 A1 | 2/2012 | Ross et al. |
| 2012/0047072 A1 | 2/2012 | Larkin |
| 2012/0050144 A1 | 3/2012 | Morlock |
| 2012/0070041 A1 | 3/2012 | Wang |
| 2012/0072340 A1 | 3/2012 | Amron |
| 2012/0076183 A1 | 3/2012 | Dapper et al. |
| 2012/0078673 A1 | 3/2012 | Koke et al. |
| 2012/0078741 A1 | 3/2012 | DeLine |
| 2012/0116929 A1 | 5/2012 | Gventer et al. |
| 2012/0130840 A1 | 5/2012 | Carlier et al. |
| 2012/0136479 A1 | 5/2012 | Signorelli et al. |
| 2012/0143755 A1 | 6/2012 | Burrell |
| 2012/0158297 A1 | 6/2012 | Kim et al. |
| 2012/0159590 A1* | 6/2012 | Novack ............. H04L 9/3231 726/7 |
| 2012/0160912 A1 | 6/2012 | Laracey |
| 2012/0170728 A1 | 7/2012 | Wengrovitz et al. |
| 2012/0179982 A1 | 7/2012 | Gandhi et al. |
| 2012/0185386 A1 | 7/2012 | Salama et al. |
| 2012/0195184 A1 | 8/2012 | Dapper et al. |
| 2012/0197773 A1 | 8/2012 | Grigg et al. |
| 2012/0197797 A1 | 8/2012 | Grigg et al. |
| 2012/0197798 A1 | 8/2012 | Grigg et al. |
| 2012/0203892 A1 | 8/2012 | Pignataro et al. |
| 2012/0206561 A1 | 8/2012 | Huang |
| 2012/0221464 A1 | 8/2012 | Pasquero et al. |
| 2012/0259776 A1 | 10/2012 | Bajaj et al. |
| 2012/0259778 A1 | 10/2012 | Banerjee et al. |
| 2012/0265809 A1 | 10/2012 | Hanson et al. |
| 2012/0271692 A1 | 10/2012 | Huang et al. |
| 2012/0278115 A1 | 11/2012 | Acharya et al. |
| 2012/0278234 A1 | 11/2012 | Dent et al. |
| 2012/0289213 A1 | 11/2012 | Levien et al. |
| 2012/0300014 A1 | 11/2012 | Krantz |
| 2012/0303548 A1 | 11/2012 | Johnson et al. |
| 2012/0320199 A1 | 12/2012 | Kundu et al. |
| 2012/0320214 A1 | 12/2012 | Kundu et al. |
| 2012/0321146 A1 | 12/2012 | Kundu et al. |
| 2012/0323642 A1 | 12/2012 | Camp et al. |
| 2013/0005253 A1 | 1/2013 | Grigg et al. |
| 2013/0018791 A1 | 1/2013 | Mendicino et al. |
| 2013/0024418 A1 | 1/2013 | Sitrick et al. |
| 2013/0030915 A1 | 1/2013 | Statler et al. |
| 2013/0042314 A1 | 2/2013 | Kelley |
| 2013/0045758 A1 | 2/2013 | Khorashadi et al. |
| 2013/0048724 A1 | 2/2013 | Burnside et al. |
| 2013/0104214 A1 | 4/2013 | Beck et al. |
| 2013/0121131 A1 | 5/2013 | Dapper et al. |
| 2013/0138497 A1 | 5/2013 | Yan et al. |
| 2013/0145284 A1 | 6/2013 | Anantharaman et al. |
| 2013/0150006 A1 | 6/2013 | Nunally et al. |
| 2013/0159195 A1 | 6/2013 | Kirillin et al. |
| 2013/0165154 A1 | 6/2013 | Joshi |
| 2013/0171958 A1 | 7/2013 | Goodson et al. |
| 2013/0173387 A1 | 7/2013 | Adelaar |
| 2013/0173404 A1 | 7/2013 | Scipioni |
| 2013/0173492 A1 | 7/2013 | Leavenworth et al. |
| 2013/0182114 A1 | 7/2013 | Zhang et al. |
| 2013/0182904 A1 | 7/2013 | Zhang et al. |
| 2013/0203383 A1 | 8/2013 | Stopel et al. |
| 2013/0208234 A1 | 8/2013 | Lewis |
| 2013/0211718 A1 | 8/2013 | Yoo et al. |
| 2013/0212017 A1 | 8/2013 | Bangia |
| 2013/0217416 A1 | 8/2013 | Matthews, III et al. |
| 2013/0238497 A1 | 9/2013 | Ramachandran et al. |
| 2013/0242262 A1 | 9/2013 | Lewis |
| 2013/0246301 A1 | 9/2013 | Radhakrishnan et al. |
| 2013/0253818 A1 | 9/2013 | Sanders et al. |
| 2013/0261964 A1 | 10/2013 | Goldman et al. |
| 2013/0275163 A1 | 10/2013 | Kaiser |
| 2013/0282744 A1 | 10/2013 | Hartman et al. |
| 2013/0290884 A1 | 10/2013 | Sotoike |
| 2013/0297422 A1 | 11/2013 | Hunter et al. |
| 2013/0297705 A1 | 11/2013 | Arora et al. |
| 2013/0300541 A1 | 11/2013 | Pesonen et al. |
| 2013/0310081 A1 | 11/2013 | Chu |
| 2013/0317778 A1 | 11/2013 | Gupta et al. |
| 2013/0325587 A1 | 12/2013 | Kothari et al. |
| 2013/0328725 A1 | 12/2013 | Wuoti et al. |
| 2013/0332271 A1 | 12/2013 | Hay |
| 2013/0346189 A1 | 12/2013 | Isaacs |
| 2014/0006219 A1 | 1/2014 | Wouhaybi et al. |
| 2014/0006281 A1 | 1/2014 | Leber |
| 2014/0020073 A1 | 1/2014 | Ronda et al. |
| 2014/0025448 A1 | 1/2014 | Maxfield, IV et al. |
| 2014/0029745 A1 | 1/2014 | Lyman |
| 2014/0032297 A1 | 1/2014 | Germann et al. |
| 2014/0032345 A1 | 1/2014 | Moore |
| 2014/0033067 A1 | 1/2014 | Pittenger et al. |
| 2014/0039950 A1 | 2/2014 | Appel et al. |
| 2014/0039951 A1 | 2/2014 | Appel et al. |
| 2014/0046830 A1 | 2/2014 | Orozco et al. |
| 2014/0058914 A1 | 2/2014 | Song et al. |
| 2014/0068785 A1 | 3/2014 | Gventer et al. |
| 2014/0074800 A1 | 3/2014 | Gventer et al. |
| 2014/0105263 A1 | 4/2014 | Geile |
| 2014/0108288 A1 | 4/2014 | Calman et al. |
| 2014/0108557 A1 | 4/2014 | Calman et al. |
| 2014/0110481 A1 | 4/2014 | Burnside et al. |
| 2014/0114877 A1 | 4/2014 | Montano |
| 2014/0201025 A1 | 7/2014 | Adoni et al. |
| 2014/0222603 A1 | 8/2014 | Hay |
| 2014/0235261 A1 | 8/2014 | Fan et al. |
| 2014/0250512 A1 | 9/2014 | Goldstone et al. |
| 2014/0257932 A1 | 9/2014 | Joa et al. |
| 2014/0257933 A1 | 9/2014 | Joa et al. |
| 2014/0258028 A1 | 9/2014 | Bynum et al. |
| 2014/0259190 A1 | 9/2014 | Kiang et al. |
| 2014/0263648 A1 | 9/2014 | Van Bosch et al. |
| 2014/0270108 A1 | 9/2014 | Riahi et al. |

(56) References Cited

U.S. PATENT DOCUMENTS

| | | |
|---|---|---|
| 2014/0270109 A1 | 9/2014 | Riahi et al. |
| 2014/0270146 A1 | 9/2014 | Riahi et al. |
| 2014/0279072 A1 | 9/2014 | Joseph |
| 2014/0279276 A1 | 9/2014 | Tolcher |
| 2014/0279430 A1 | 9/2014 | Holman et al. |
| 2014/0279450 A1 | 9/2014 | Gujral |
| 2014/0279458 A1 | 9/2014 | Holman et al. |
| 2014/0279483 A1 | 9/2014 | Bridges et al. |
| 2014/0279497 A1 | 9/2014 | Qaim-Maqami et al. |
| 2014/0279498 A1 | 9/2014 | Qaim-Maqami et al. |
| 2014/0279506 A1 | 9/2014 | Bridges et al. |
| 2014/0279688 A1 | 9/2014 | Ginsberg et al. |
| 2014/0282877 A1 | 9/2014 | Mahaffey et al. |
| 2014/0283005 A1 | 9/2014 | Avni et al. |
| 2014/0283018 A1 | 9/2014 | Dadu et al. |
| 2014/0289116 A1 | 9/2014 | Polivanyi |
| 2014/0296433 A1 | 10/2014 | Alexander et al. |
| 2014/0297438 A1 | 10/2014 | Dua |
| 2014/0297527 A1 | 10/2014 | McLaughlin et al. |
| 2014/0298433 A1 | 10/2014 | McLaughlin et al. |
| 2014/0309770 A1 | 10/2014 | Signorelli et al. |
| 2014/0310171 A1 | 10/2014 | Grossman et al. |
| 2014/0310172 A1 | 10/2014 | Grossman et al. |
| 2014/0315517 A1 | 10/2014 | Cohan |
| 2014/0325019 A1 | 10/2014 | Austin et al. |
| 2014/0333414 A1 | 11/2014 | Kursun |
| 2014/0337221 A1 | 11/2014 | Hoyos |
| 2014/0344149 A1 | 11/2014 | Campos |
| 2014/0358799 A1 | 12/2014 | Kingston et al. |
| 2014/0365377 A1 | 12/2014 | Salama et al. |
| 2015/0012426 A1 | 1/2015 | Purves et al. |
| 2015/0012444 A1 | 1/2015 | Brown et al. |
| 2015/0019441 A1 | 1/2015 | Brown et al. |
| 2015/0058215 A1 | 2/2015 | Johnson |
| 2015/0059002 A1 | 2/2015 | Balram et al. |
| 2015/0089585 A1 | 3/2015 | Novack |
| 2015/0095235 A1 | 4/2015 | Dua |
| 2015/0120550 A1 | 4/2015 | Jung et al. |
| 2015/0142596 A1 | 5/2015 | Jakobson et al. |
| 2015/0163056 A1 | 6/2015 | Nix |
| 2015/0294405 A1 | 10/2015 | Hanson et al. |
| 2015/0312762 A1 | 10/2015 | Hernandez et al. |
| 2015/0356526 A1 | 12/2015 | Christmas |
| 2016/0012412 A1 | 1/2016 | Scanlon et al. |
| 2016/0063619 A1 | 3/2016 | Smith et al. |
| 2016/0100282 A1 | 4/2016 | Pounds et al. |
| 2016/0132847 A1 | 5/2016 | Sarris |
| 2016/0154458 A1* | 6/2016 | Liu .................. G03H 1/0005 348/40 |
| 2016/0209648 A1 | 7/2016 | Haddick et al. |
| 2016/0335511 A1* | 11/2016 | Macdonald ........ G06K 9/00335 |
| 2017/0109718 A1* | 4/2017 | Raja .................... G06Q 20/385 |
| 2017/0163750 A1* | 6/2017 | Sullivan ................. H04L 67/22 |
| 2018/0286126 A1* | 10/2018 | Schwarz ................. G06F 3/011 |
| 2019/0147665 A1* | 5/2019 | Banavara ................ G06T 15/08 345/419 |

OTHER PUBLICATIONS

Zhu et al., "SenSec: Mobile security through passive sensing," 2013 International Conference on Computing, Networking and Communications (ICNC) Year: 2013 | Conference Paper | Publisher: IEEE.*

Bank of America Newsroom, Bank of America Adds Human Touch to New ATMs, Apr. 4, 2013, pp. 1-5.

International Search Report and Written Opinion dated Aug. 2, 2011 for International Patent Application No. PCT/US2011/033901.

IPRP and Written Opinion dated Oct. 30, 2012 for International Application No. PCT/US2011/033901.

IVisit, iVisit Presenter, iVisit Video Conferencing & Collaboration Solutions for Mobile and Desktop, http://www.ivisit.com/products_presenter.php, accessed Mar. 26, 2013, 3 pgs.

Kiran Kadambi, "Near-Field Communication-Based Secure Mobile Payment," ACM 2009, pp. 142-151.

Stamatis Karnouskos et al. "Mobile Payment: A journey through existing procedures and standardization initiatives,", IEEE Communication Surveys & Tutorial, Fourth Quarter 2004, vol. 6, No. 4, pp. 44-66.

Swartz, Kathryn: "Chase iPhone App Launches Support for Mobile Deposits" (3 pages total); http://www.appolicious.com/finance/articles/2259-chase-iphone-app-launches-support-for-mobile-deposits; downloaded Apr. 14, 2011.

Wayne Jansen et al., NISTIR 7200, Proximity Beacons and Mobile Device Authentication: An Overview and Implementation; http://csrc.nist.gov/publications/nistir/NIST-IR-7200.pdf, Jun. 2005; 36 pages.

www.usaa.com/inet/pages/deposit_at_mobile_main (1 page total) downloaded Apr. 14, 2011.

* cited by examiner

SYSTEM FOR AUTHENTICATION OF A USER BASED ON MULTI-FACTOR PASSIVELY ACQUIRED DATA

CROSS-REFERENCE TO RELATED APPLICATION

This application is a continuation of and claims priority from allowed, co-pending U.S. patent application Ser. No. 15/628,088, filed Jun. 20, 2017, now United States Patent Publication No. 2018-0367542 dated Dec. 20, 2018, and entitled "SYSTEM FOR AUTHENTICATION OF A USER BASED ON MULTI-FACTOR PASSIVELY ACQUIRED DATA".

FIELD OF THE INVENTION

The present invention embraces a system, computer program product, and method for authenticating a user based on passive authentication methods.

BACKGROUND

Balancing computer security with efficiency and expediency of use is a constant challenge with respect to computing systems today. Traditional interfaces often require a user to navigate through an extensive array of options to execute certain actions, and often subject the user to onerous authentication requirements to utilize the system. Accordingly, there is a need for a more efficient way to reduce the amount of input needed from the user to execute certain actions while also providing a seamless, efficient method of authentication.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The invention relates to use of passively gathered data about a user in a facility, such as a virtual center, to provide a means to authenticate a user for certain transactions in the facility without requiring the user to actively provide credential data. The system collects various passively gathered information about the user in the facility, such as facial and voice recognition data, beacon information associated with the user's phone, user pattern/transaction data, information regarding user intentions before coming into the facility via online banking, interactions with representatives, etc. This data is weighted and evaluated by a system. An authentication confidence level value is developed. This confidence value is then compared to an authentication scale indicating an amount of authentication confidence needed to perform a certain transactions. The system then allows the user to perform transactions that are qualified based on the authentication confidence level value without requiring the user to actively provide authentication credentials.

Embodiments of the present invention provide a system, computer program product, and method for authenticating a user within a virtual center by using passive authentication.

The invention comprises an interface computing system comprising a first processor; a first communication interface; and a first memory having a virtual ambassador application stored therein. The virtual ambassador application, when executed by the first processor, causes the first processor to detect, via one or more sensors, a presence of the user within the virtual center; attempt to verify an identity of the user using a first passive authentication method; increase a confidence value associated with the identity of the user by a predetermined amount associated with the first passive authentication method; detect that the confidence value associated with the identity of the user has met or exceeded a first threshold; authorize a first set of actions based on the confidence value meeting or exceeding the first threshold; and present to the user a first menu of actions, wherein the first menu of actions comprises the first set of actions.

In some embodiments, the virtual ambassador application further causes the first processor to attempt to verify an identity of the user using a second passive authentication method; increase the confidence value associated with the identity of the user by a predetermined amount associated with the second passive authentication method; attempt to verify an identity of the user using a third passive authentication method; increase the confidence value associated with the identity of the user by a predetermined amount associated with the third passive authentication method; detect that the confidence value associated with the identity of the user has met or exceeded a second threshold; authorize a second set of actions based on the confidence value meeting or exceeding the second threshold; and present to the user a second menu of actions, wherein the second menu of actions comprises the second set of actions.

In some embodiments, the virtual ambassador application further causes the first processor to integrate the first set of actions and the second set of actions; and present to the user a combined menu of actions, wherein the combined menu of actions comprises the first set of actions and the second set of actions.

In some embodiments, the first passive authentication method is facial recognition.

In some embodiments, the second passive authentication method is wireless detection of an entity-issued card, wherein the third passive authentication method is voice recognition.

In some embodiments, the virtual ambassador application further causes the first processor to detect that the confidence value has not met or exceeded a third threshold; initiate an active authentication method; and prompt the user to provide authentication credentials.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
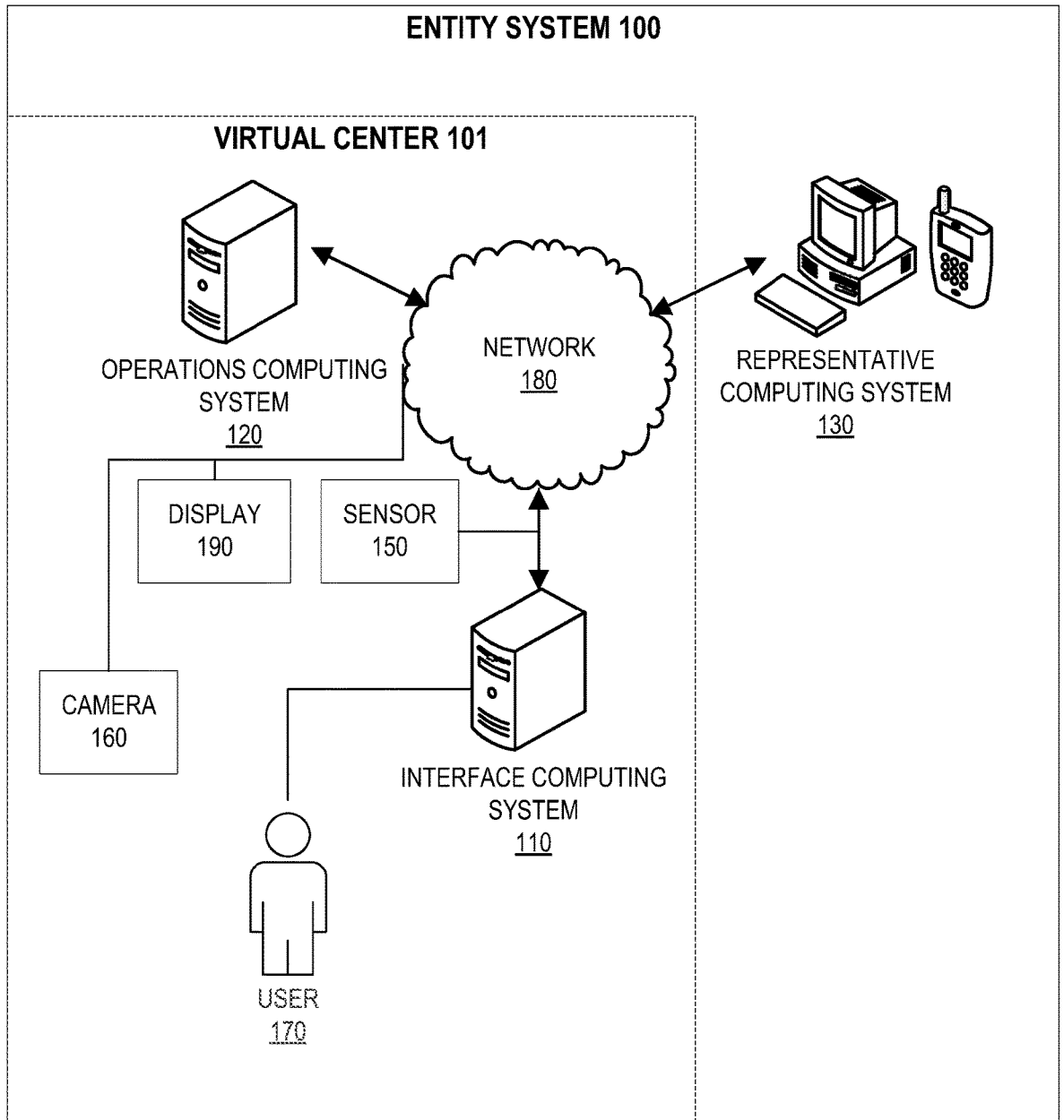
Figure 2:
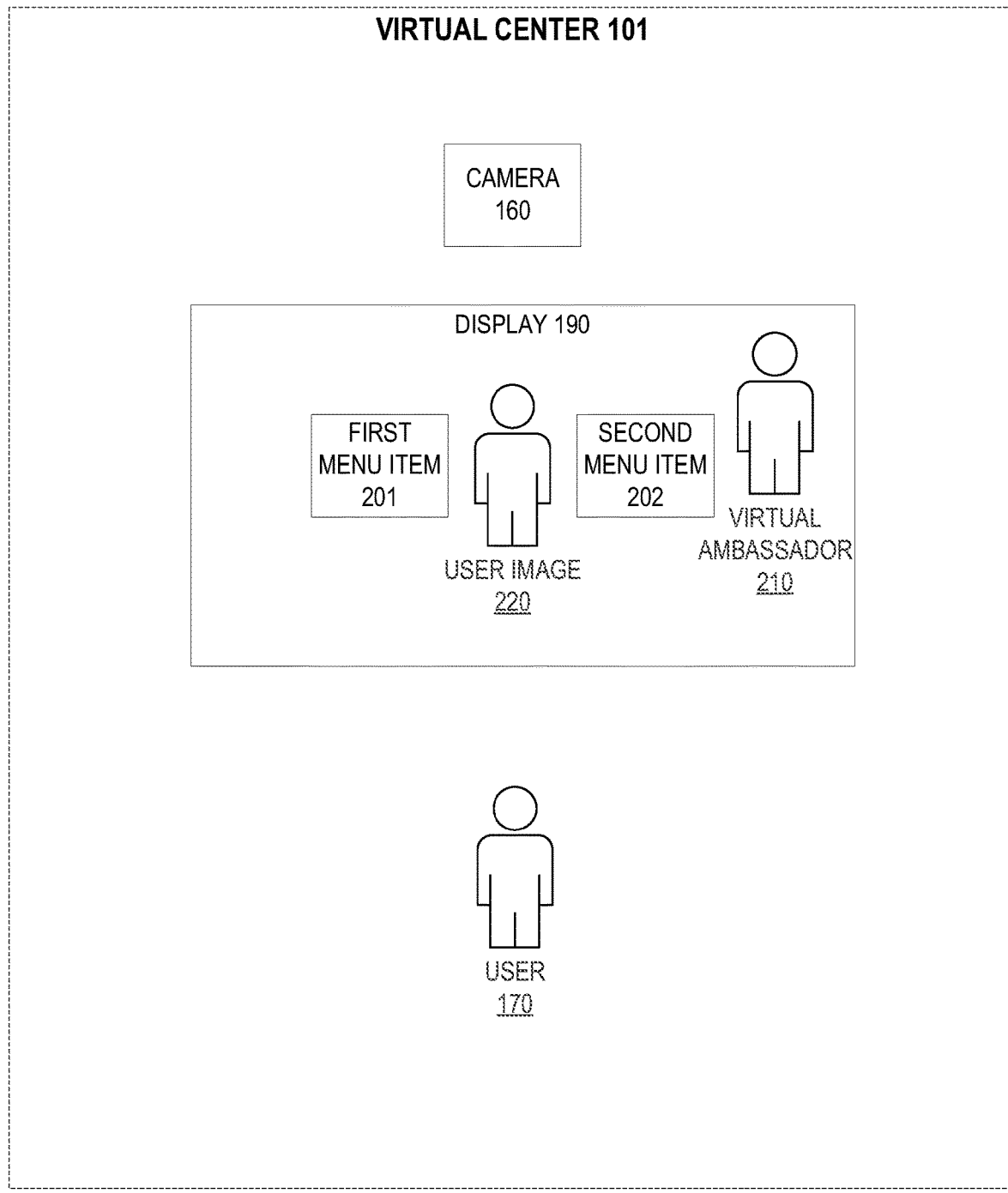
Figure 3:
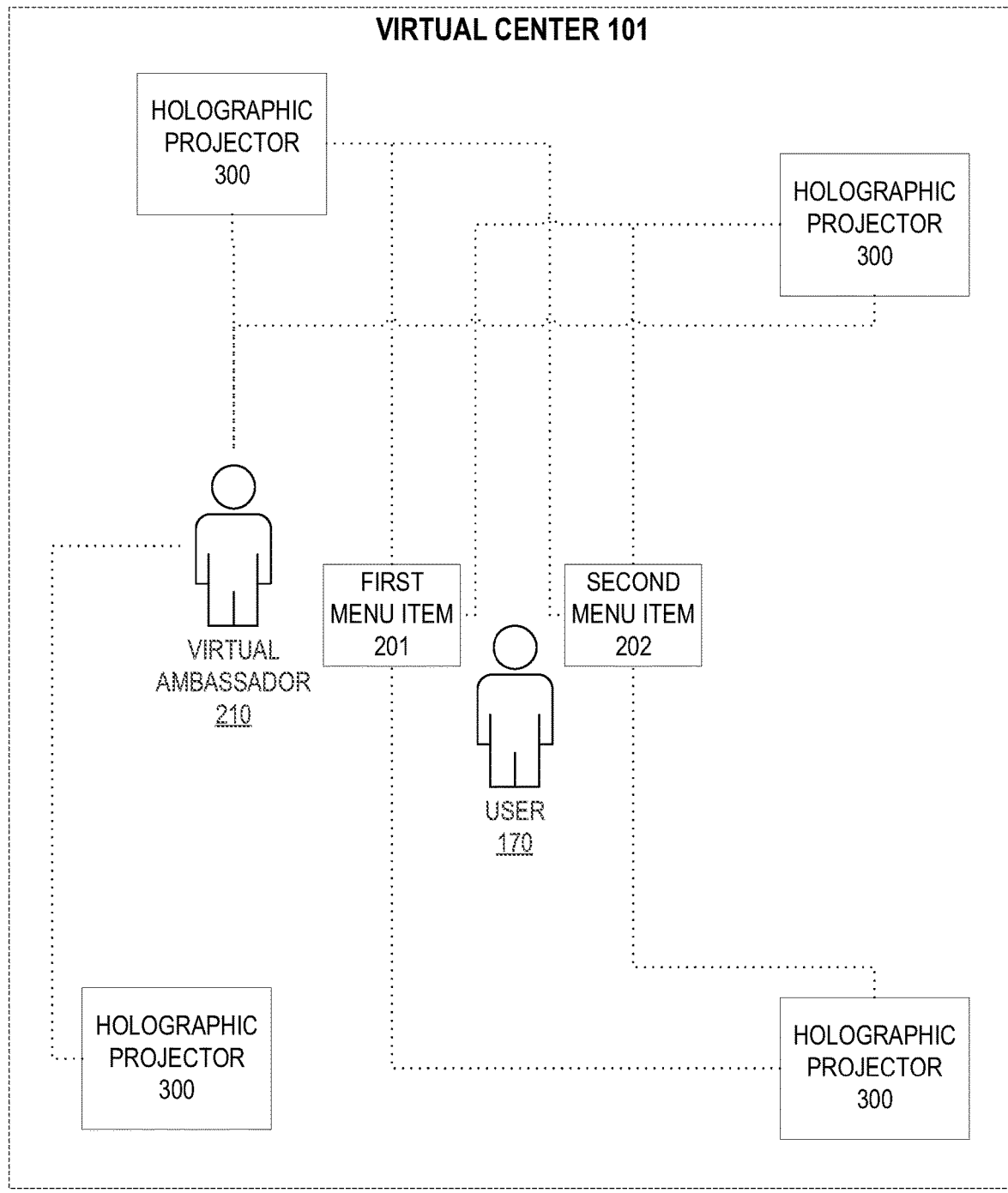
Figure 4:
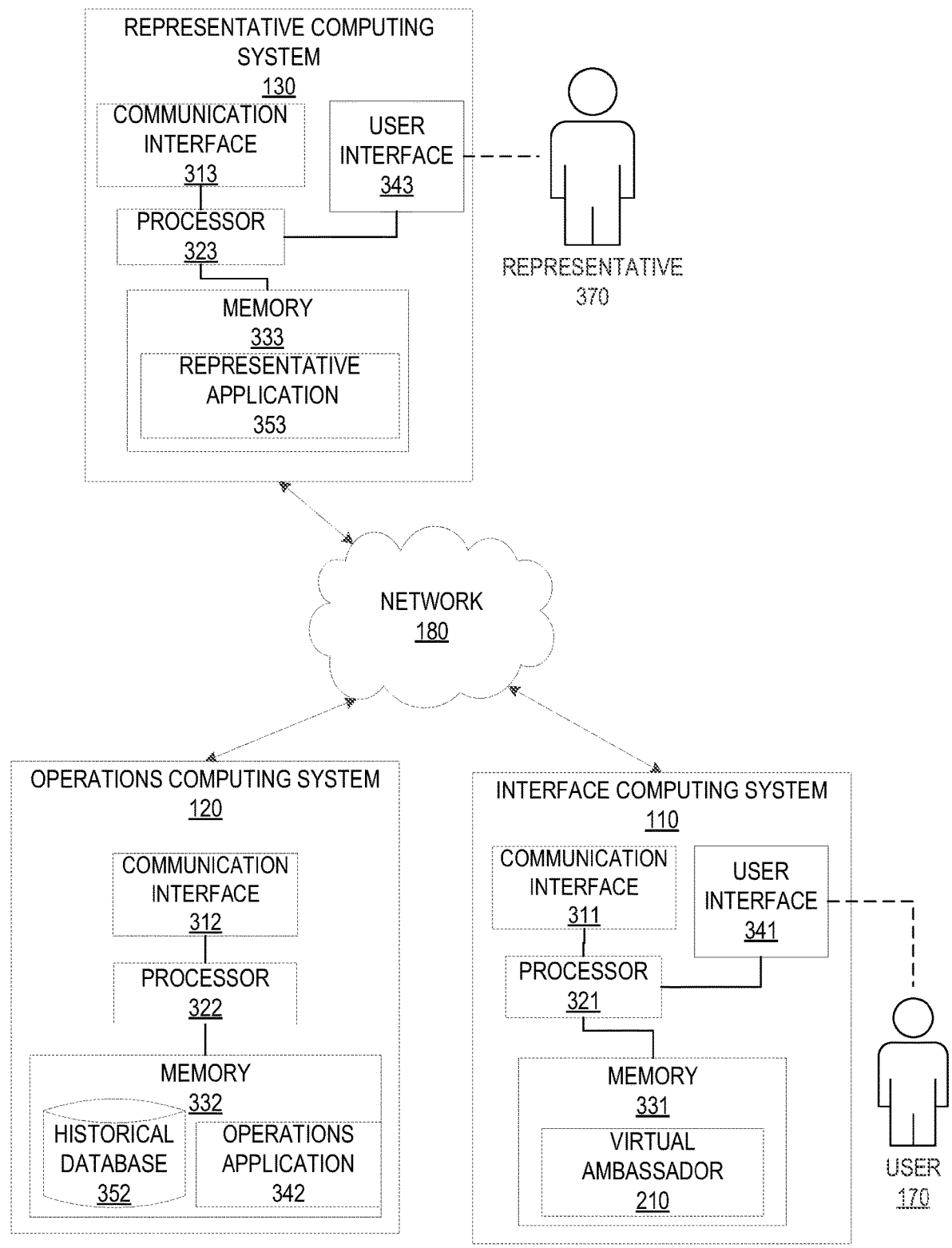
Figure 5:
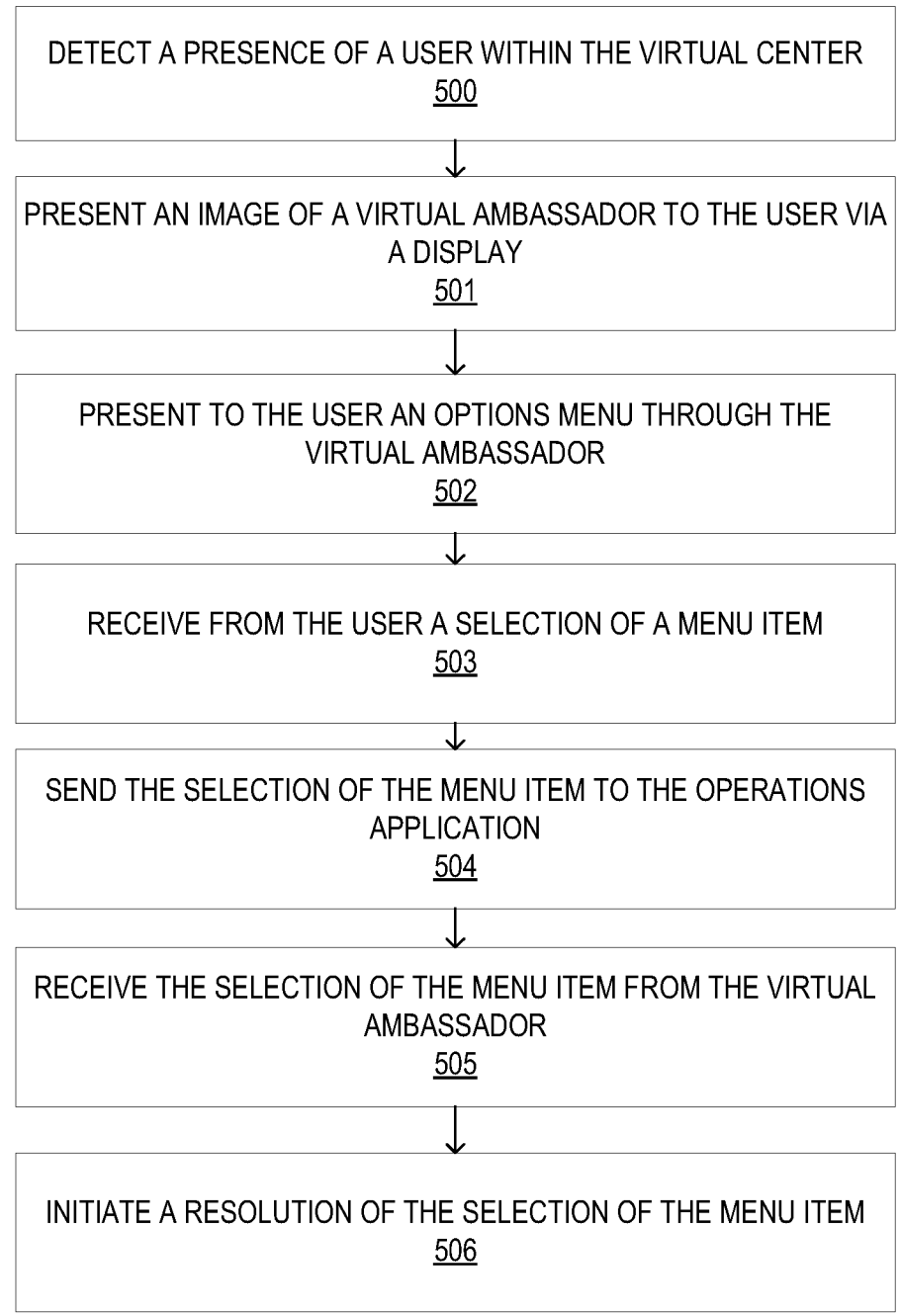
Figure 6:
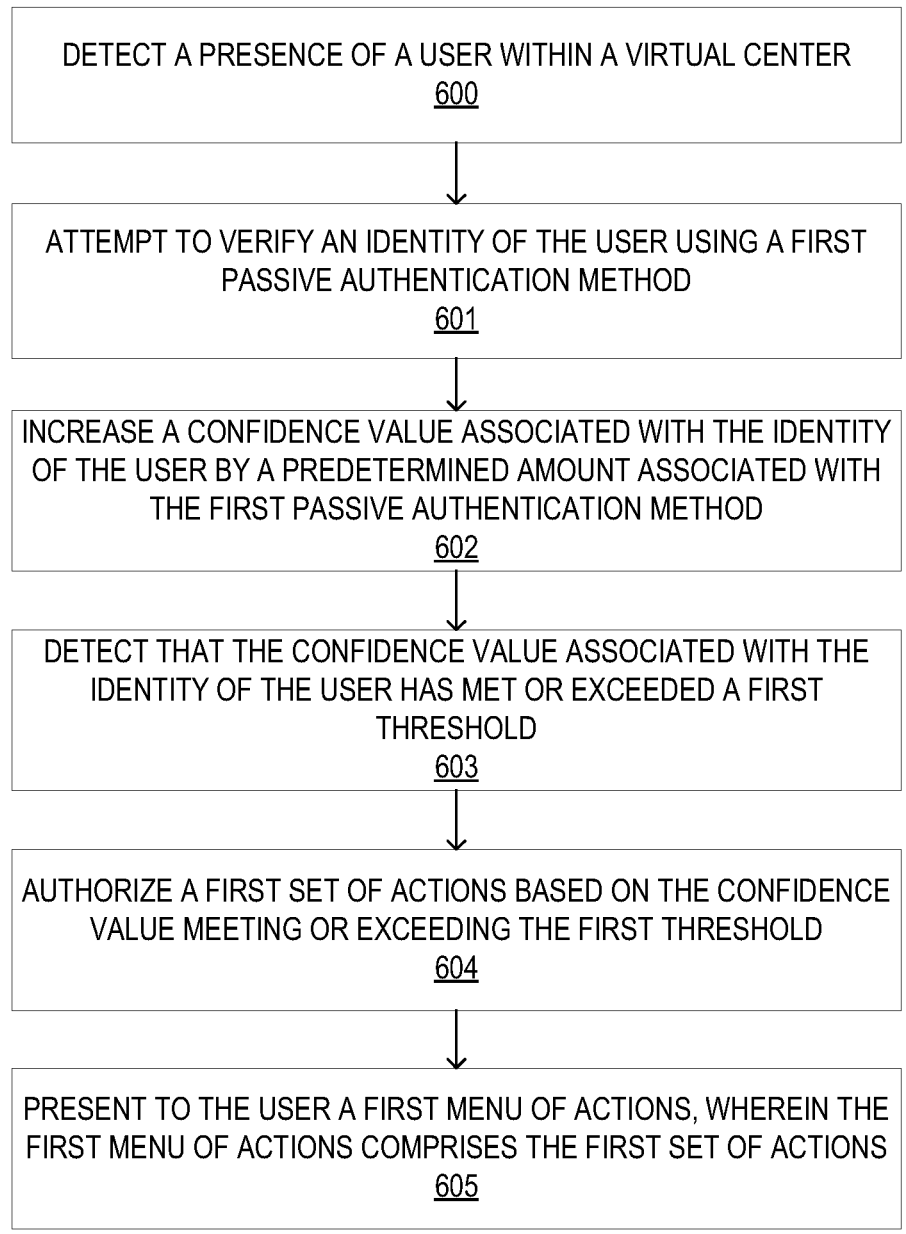

Having thus described embodiments of the invention in general terms, reference will now be made to the accompanying drawings, wherein:

FIG. 1 depicts an operating environment, in accordance with one embodiment of the present invention;

FIG. 2 depicts a schematic of the interface provided to a user within the virtual center in accordance with one embodiment of the present invention;

FIG. 3 depicts a schematic of a system for providing an augmented/virtual reality experience within a virtual center, in accordance with one embodiment of the present invention;

FIG. 4 depicts a schematic illustrating the interface computing system, the operations computing system, and the representative computing system in more detail, in accordance with one embodiment of the present invention;

FIG. 5 depicts a process flow of the virtual ambassador system within the virtual center, in accordance with one embodiment of the present invention; and FIG. 6 depicts a process flow illustrating a method for using passive-based authentication to authorize transactions, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates a system of networked computing devices and/or systems on which the augmented resource facility is implemented. The entity may be a business organization, a non-profit organization, a government organization, and the like.

"User" as used herein may refer to an individual who may log onto the system through the augmented resource facility. Typically, the user is authorized by the entity to access the system. Accordingly, the user may be a customer of an entity who owns an account within the entity's system. In other embodiments, the user may be a potential customer of the entity. Alternatively, the user may also be an employee of the entity.

"Computing system" as used herein may refer to a networked computing device within the entity system. The computing system may include a processor, a non-transitory storage medium, a communications device, and a display. The computing system may support user logins and inputs from any combination of similar or disparate devices. Accordingly, the computing system may be a portable electronic device such as a smartphone, tablet, or laptop, or the computing may be a stationary unit such as a personal desktop computer or networked terminal within an entity's premises. In some embodiments, the computing system may be a local or remote server which is configured to send and/or receive inputs from other computing systems on the network.

"Account" as used herein may refer to a personalized record kept within an entity on behalf of a user. Each account is associated with a specific authorized user and contains information on resources owned by the user and held by the entity.

"Resource" as used herein may refer to an object under the ownership of a user which is stored or maintained by the entity on the user's behalf. The resource may be intangible or tangible objects such as data files, documents, biographical data, funds, and the like. Typically, the user's account contains records of the resources owned by the user. Account data may be stored in an account database within the entity's systems.

"Virtual center" as used herein may refer to a partially or fully located on the entity's premises that is intended to receive customers or potential customers of the entity. A virtual center may be configured to run autonomously without on-site employees while simultaneously allowing customers to perform all of the functions that would ordinarily be available to the customer at a traditional service center.

Embodiments of the present invention provide a system, computer program product, and method for management of resources through an augmented resource facility. In particular, a virtual center owned and operated by an entity may include a user-facing computing system. Said computing system may, through one or more cameras, sensors, and/or displays, provide an augmented or virtual reality experience to the user when the user interacts with the computing system to manage account resources. Typically, the computing system is located in a fixed position within the entity's premises. In such embodiments, the user-facing computing system serves as the interface between the user and the virtual center. In this way, the virtual center provides the user with a novel way to access information or manage account resources. One skilled in the art may understand that said computing system may comprise one or more computing systems distributed throughout the virtual center to provide a seamless augmented or virtual reality experience to the user.

The virtual center may further comprise a virtual ambassador stored within the user-facing computing system. The virtual ambassador may be presented on one or more displays within the virtual center to interface with the user. Said displays may be one or more fixed position screens that display the virtual ambassador, or alternatively may be holographic displays which project the virtual ambassador onto a surface within the virtual center. The virtual ambassador may be configured to detect the user's presence via the sensors and/or cameras within the virtual center. The virtual ambassador may then greet the user with a visual or audio message, and prompt the user for inputs to determine the nature of the user's visit to the virtual center. For instance, the user may wish to transfer resources from one account to another account. In other embodiments, the user may wish to open a new account or make modifications to an existing account. The user may indicate the intent to transfer resources to the virtual ambassador through various methods of input, such as by voice commands, keypad entry, touchscreen entry, motion technology, and the like. Upon determining the user's intent, the virtual ambassador may direct the user to take the appropriate next steps in fulfilling the purpose of the user's visit. For instance, the virtual ambassador may direct the user to a designated area within the virtual center, such as a private booth, to complete a resource transfer. The virtual ambassador may further virtually connect the user to an offsite entity representative to provide further assistance to the user.

In some embodiments, the virtual center may comprise a historical database which comprises historical data, which tracks the virtual center's interactions with each user. For instance, the historical data may contain information on each visit by a particular user, such as the time/date of the visit, the reason for the visit, the length of the visit, what actions were taken by the user, the resolution of the visit, and the like. Based on this data, the virtual center may calculate projections for a particular user based on predicted future visits by the user. For instance, based on a user visiting the virtual center on a regular basis on a particular day and time of day for a particular reason, the system may determine that the user is likely to visit the virtual center at the same time and day in the future for the same reason. Using this prediction, the virtual ambassador may prompt the user to confirm that the user is present at the virtual center for the predicted reason, as soon as the user walks into the virtual center. In some embodiments, the system may further be configured to detect one or more problems with a user's account and notify the user of the problems through the virtual ambassador. In this way, the system may reduce the number of steps necessary to accomplish the user's objective of the visit to the virtual center.

The virtual center may further comprise a multi-factored authentication system to identify users who have accounts with the entity and users who do not. The authentication system may comprise a plurality of devices to receive authentication input from the user, such as cameras, microphones, biometric sensors, motion sensors, proximity sensors, RFID/NFC or other wireless sensors, touchpads, keypads, keyboards, and the like. Accordingly, the authentication system may utilize a combination of multiple authentication methods to identify and authenticate a user, such as facial recognition, voice recognition, fingerprint/retinal recognition, detection of cards/chips or smartphones located with the user, PINs, passwords, cryptographic keys, tokens, and the like. The various authentication methods may be used to calculate a confidence value for the authentication system, where the confidence value reflects the degree of certainty of the user's identity. Each authentication method may, upon identifying a positive match for a user, increase the confidence value by a certain degree. For instance, biometric recognition from fingerprint or retinal scanners may contribute a greater amount to the confidence value than identification by a card located on the user. In some embodiments, the virtual center may utilize a number of authentication methods to identify a user as the user walks into the virtual center. For example, the virtual center may identify the face of the user as well as whether the user is carrying a card or chip provided by the entity. Once a positive matches are identified for the user's face and entity-provided card, the confidence value may meet or exceed a first threshold, at which point the virtual ambassador may then greet the user by name. After the initial greeting, the system may prompt the user to provide additional authentication, such as by fingerprint, voice, PIN, password, and the like. Upon receiving said additional authentication, the confidence value may increase to meet or exceed a second threshold, after which the number of available actions (e.g. accessing sensitive data or transferring a large amount of resources) to the user increases. In this way, the system provides a seamless authentication experience to the user while simultaneously protecting against misidentification by the virtual center system. In other embodiments, the user may have made an appointment to visit the virtual center. In such embodiments, the user's arrival at the appointed time may serve to increase the confidence value.

In some embodiments, the virtual center may comprise a smart learning wall, which comprises one or more interactive displays. In some embodiments, the displays may be two-dimensional displays such as a touchscreen monitor or screen. In other embodiments, the displays may be three-dimensional holographic displays. Each display in the smart learning wall may be configured to display relevant information to the user. For instance, the display may provide information or tips for managing resources in the user's account. In some embodiments, the smart learning wall may integrate artificial intelligence (AI) products that may detect the user's identity and provide personalized information based on the user's interactions with the AI.

The virtual center system addresses a number of computer technology-centric challenges associated with interfacing with the user and authenticating the user. In particular, by predicting future actions by the user within the virtual center and prompting the user to confirm the nature of the user's visit, the system is able to seamlessly short-circuit the intermediate steps necessary to determine the nature of the visit, thereby increasing the computing efficiency of the system. Furthermore, providing a multi-factor authentication process further increases the computing efficiency of the system by further reducing the intermediate authentication steps necessary for the user to perform certain functions within the system, as well as by preventing wasteful use in computing resources associated with misidentification or failures to authenticate a user. Said computing resources may include processing power, memory space, storage space, cache space, electric power, and networking bandwidth.

FIG. 1 is a block diagram illustrating an operating environment 001, in accordance with one embodiment of the present invention. The operating environment may include a virtual center 101 within an entity system 100. The entity system 100 comprises the various computing systems within the entity at large and encompasses the computing systems within each virtual center 101. A virtual center 101 may in turn comprise an interface computing system 110 in operative communication with an operations computing system 120 within the virtual center 101 and a representative computing system 130 outside of the virtual center 101 but within the entity system 100 over a network 180. The network 180 may, for example, be a global area network (GAN), such as the Internet, a wide area network (WAN), a local area network (LAN), or any other type of network or combination of networks. The network 180 may provide for wireline, wireless, or a combination wireline and wireless communication between the various devices and computing systems on the network 180. The user computing system may be a mobile device such as a smartphone, tablet, or laptop, a personal computing device such as a desktop computer, smart device, single board computer, or a device owned and operated by an entity, such as a computer system terminal located on the entity's premises. It should be understood by those of ordinary skill in the art that the various devices and computing systems as depicted herein may be embodied in a single device or computing system or multiple devices and/or computing systems distributed throughout the virtual center 101 and/or the entity system 100. Typically, the interface computing system 110 comprises the hardware and software necessary to implement, execute, and display the virtual ambassador to a user 170. The interface computing system 110 may further comprise at least a portion of the hardware and software to identify and authenticate the user 170. The user 170 may be an individual who owns an account with the entity and is visiting the virtual center 101 to accomplish a particular objective with respect to the account of the user 170, such as a transfer of resources (e.g. withdrawal or deposit of funds within the user's account), utilization of other services offered by or through the entity (e.g. insurance, real estate funding), updates to biographical settings or user preferences, and the like. In other embodiments, the user 170 may be an individual without an account with the entity who wishes to obtain more information about the entity.

Typically, the user 170 interacts with the interface computing system 110 as soon as the user 170 walks into the virtual center 101. The interface computing system 110 identifies the user 170 and determines the nature of the user's 170 visit to the virtual center 101. The interface computing system 110 may, through the virtual ambassador, obtain both passive authentication data (e.g. authentication data obtained without conscious intervention by the user, such as by identification of a cryptographic key/token on the user's portable device, facial recognition, and the like) and active authentication data (e.g. authentication data provided by a deliberate and conscious action by the user, such as by biometric fingerprint, a PIN, a password, voice recognition, and the like) to provide a more seamless authentication experience for each user. In authenticating the user 170, the interface computing system 110 may communicate with one or more operations computing systems 120, which store and execute the instructions and data necessary for the functioning of the virtual center 101. For instance, the operations computing system 120 may contain the authentication tables necessary to authenticate the user. The operations computing system 120 may further contain the historical database, which allows the system to track each interaction of the user 170 with the one or more virtual centers 101 within the entity system 100 in order to predict a future action to be taken by the user 170. The operations computing system 120 may be responsible for performing the steps necessary to fulfill the objective of the user 170, such as transfer of resources to or from accounts, generation of electronic or physical documents, or other functions related to account management.

In some embodiments, the virtual center 101 may be equipped with one or more sensors 150 and one or more cameras 160. Some sensors 150 and cameras 160 may be integrated into the interface computing system 110 and/or the operations computing system 120, and others may be operatively connected to the interface computing system 110 and/or the operations computing system 120 via the network 180. "Sensor" as used herein may refer to a number of different devices through which the virtual center 101 receives input data, such as motion sensors, proximity sensors, light sensors, wireless device sensors, audio sensors (e.g. microphones), heat sensors, and the like. The sensors 150 are typically configured to track the user's 170 movement and position as the user 170 moves throughout the virtual center 101. Furthermore, the cameras 160 may be configured to track the orientation of the user 170 as the user 170 moves throughout the virtual center 101. Based on the sensor 150 and camera 160 data, the interface computing system 110 and/or the operations computing system 120 may present the virtual ambassador and/or an input selection interface to the user 170 through one or more displays 190 within the virtual center 101. In some embodiments, the displays 190 may be monitors or screens integrated into the interface computing system 110 and/or the operations computing system 120.

The interface computing system 110 and/or the operations computing system 120 may be in operative communication with a representative computing system 130 which is located outside of the virtual center 101. At various stages in the resolution to the user's needs, the interface computing system 110 and/or the operations computing system 120 may determine that an off-site representative is required to further assist the user 170. In such situations, the interface computing system 110 and/or the operations computing system 120 may initiate a video/audio conferencing session with said representative through the representative computing system 130. Upon initiating the session, a video and/or audio stream from the representative computing system 130 may be displayed to the user 170. In some embodiments, the one or more streams may be displayed on a screen located on the interface computing system 110 or the operations computing system 120. In some embodiments, the one or more streams may be projected onto a surface within the virtual center 101 to create a three-dimensional holographic image of the representative. In some embodiments, the representative may determine that another representative is required to further assist the user 170. In such an embodiment, the first representative may connect the user 170 with the second representative within the video conferencing session. The system may be configured such that the first representative remains connected to the video conferencing session until the second representative has connected to the video conferencing session. In this way, the system maintains a chain of connectivity between the user 170 and the various systems and/or representatives within the system.

FIG. 2 is a block and symbol diagram illustrating the interface provided to a user within the virtual center, in one embodiment of the present invention. The displays 190 within the virtual center 101 may include monitors or screens located in various areas throughout the virtual center 101 which are in operative communication with the interface computing system 110 and/or the operations computing system 120 over the network 180. In such embodiments, the displays 190 may present a user image 220 on the monitor or screen, where the user image 220 is typically a captured video stream from the cameras 160. The interface computing system 110 and/or the operations computing system 120 may then render a user input menu as an overlay to the user image 220. The user input menu may track the user's 170 center of mass and follow the user's 170 movement throughout the virtual center 101, such that the user input menu is always centered around the user image 220. The user input menu may comprise a plurality of menu items 201, 202 which allow the user 170 to execute various functions within the virtual center 101. The menu items 201, 202 may take the form of a selectable area which is represented visually to the user 170. The virtual center 101 may be configured to detect when the user 170 has selected a menu item 201, 202 by determining whether the user image 220 is overlaid with the selected area. For instance, the user 170 may position a hand such that the user image's 220 hand touches the visually represented menu item 201, 202, after which point the system may recognize that the user 170 has selected said menu item 201, 202 corresponding to a desired action of the user 170. In some embodiments, the user 170 may be required to hold a part of the body within the selectable area of the menu item 201, 202 for a threshold amount of time. Upon receiving a selection of a menu item 201, 202 by the user 170, the operations computing system 120 may execute the functions necessary to carry out the desired action(s) of the user 170. The virtual ambassador 210 may provide a visual and/or audio confirmation that a particular menu item 201, 202 has been selected. In some embodiments, this may include controlling the virtual ambassador 210 to provide video and audio guidance to the user 170. In some embodiments, the virtual ambassador 210 may, depending on the location of the user 170, be presented on a display 190 in close proximity to the user 170. In this way, the virtual ambassador 210 follows the user 170 as the user 170 moves throughout the space of the virtual center 101 and provides guidance accordingly.

FIG. 3 is a block and symbol diagram illustrating a system for providing an augmented/virtual reality experience within a virtual center, in accordance with one embodiment of the present invention. In some embodiments, the virtual center 101 may comprise a plurality of three-dimensional holographic projectors 300 which are configured to project holographic images in various positions throughout the virtual center 101. In some embodiments, once the system determines the user's location within the virtual center 101 using a plurality of sensors and/or cameras, the holographic projectors 300 may project images of one or more menu items 201, 202 within the reach of the user 170. The sensors 150 and cameras 160 within the virtual center 101 may be used to constantly track the user's 170 position and orientation. If the user 170 moves to a different position within the virtual center 101, the projectors 300 may be configured to recenter the menu items 201, 202 with respect to the user 170. Typically, the menu items 201, 202 will be centered in front of the user 170 at or near eye level such that the user 170 may easily utilize the system's various functions. In this way, the user 170 has constant access to the menu items 201, 202 no matter where the user 170 moves in the virtual center 101 or in which direction the user 170 is facing. In some embodiments, the projectors 300 may further be configured to render the virtual ambassador 201 as a holographic image. The virtual ambassador 210 may be projected within the field of vision of the user 170 such that the user 170 may see the virtual ambassador 210 at all times during the user's 170 visit to the virtual center. In some embodiments, the virtual ambassador 210 may shift its position relative to the user 170 if the system detects that the user 170 is moving or intends to move to a different position within the virtual center 101. The virtual ambassador 210 may be configured to stay within the user's 170 field of vision at all times regardless of the user's 170 location or orientation within the virtual center 101. In this way, the virtual ambassador 210 is able to constantly provide guidance to the user 170 for the full duration of the visit. In some embodiments, the virtual ambassador 210 may further be configured to, upon receiving a selection of a menu item 201, 202 from the user 170, direct the user 170 to walk to a specific area and/or utilize a particular computer terminal within the virtual center 101. In such an embodiment, the virtual ambassador 210 may move from the user's 170 current location to said area/computer terminal, in order to guide the user 170. The virtual ambassador's 210 movement may be accompanied by audio and/or visual cues indicating that the user 170 should follow the virtual ambassador 210 to the new location in the virtual center 101. The virtual ambassador 210 may be configured this way, for example, when the system detects that a particular desired action of the user 170 must be conducted in a particular area or with a particular computing device.

In an exemplary embodiment, the user 170 having an account with the entity may wish to make an account withdrawal. As the user 170 walks into the virtual center 101, the interface computing system 110 may detect that the user 170 has entered the virtual center 101 through the various sensors 150 and cameras 160. The interface computing system 110 may lock on to the user 170 and initiate a session such that only the user 170 may provide inputs to the interface computing system 110 for the duration of the session. In other words, even if a subsequent user is detected by the system, said subsequent user will be prevented from making inputs by gestures, voice commands, keypad inputs, and the like until the initial user 170 has completed the session. The interface computing system 110 may utilize the various sensors 150 to passively identify and authenticate the user, using methods such as detection of a smart device associated with the user 170, facial recognition through the images captured by the cameras 160, and/or detection of a chip or card associated with the entity. At this stage, the confidence value for the user's 170 identity may cross a first threshold, at which point the virtual ambassador 210 may appear as a holographic image and may speak to the user 170 and greet the user 170 by name. In some embodiments, the virtual ambassador 210 may then prompt the user 170 to select from a number of menu items 201, 202 to determine the nature of the user's 170 visit. In other embodiments, the virtual ambassador 210 may, through data analytics, automatically determine that the user 170 is likely to have visited the virtual center 101 to make an account withdrawal. In such embodiments, the virtual ambassador 210 may post to the user 170 with a visual and/or auditory inquiry, asking whether the user 170 has visited the virtual center 101 to make an account withdrawal. The virtual ambassador 210 may then prompt the user with a visual and/or auditory cue to provide additional authentication credentials, such as a voice command, a biometric retinal or fingerprint scan, a PIN, a password, a token on a smart device, and the like. By providing one or more of said types of authentication credentials, the confidence value may be increased to or above a second threshold, at which point the system authorizes the user 170 to make the account withdrawal. In some embodiments, the confidence value may cross the second threshold solely using passive authentication to provide a "contactless" authentication method to the user 170. In some embodiments, the system may detect that the user 170 must complete the account withdrawal at a particular terminal within the virtual center 101. In such an embodiment, the virtual ambassador 210 may prompt the user 170 to follow the virtual ambassador 210, at which point the virtual ambassador 210 may begin to move towards the terminal which the user 170 must utilize to complete the transaction. The virtual ambassador 210 may stay within a predetermined distance from the user 170 until the user has successfully located and traveled to the location of the terminal. The virtual ambassador 210 may remain in close proximity to the user 170 until the user 170 has completed one or all of the objectives of the user's 170 visit to the virtual center 101.

FIG. 4 is a block diagram illustrating the interface computing system 110, the operations computing system 120, and the representative computing system within the entity system 130 in more detail, in accordance with one embodiment of the present invention. The interface computing system 110 typically contains a processor 321 communicably coupled to such devices as a communication interface 311 and a memory 331. The processor 321, and other processors described herein, typically includes circuitry for implementing communication and/or logic functions of the various computing systems, including the interface computing system 110. For example, the processor 321 may include a digital signal processor device, a microprocessor device, and various analog to digital converters, digital to analog converters, and/or other support circuits.

The interface computing system 110 may use the communication interface 311 to communicate with other devices over the network 180. The communication interface 311 as used herein may include an Ethernet interface, an antenna coupled to a transceiver configured to operate on a cellular data or WiFi signal, and/or a near field communication ("NFC") interface.

The interface computing system 110 may include a memory 331 operatively coupled to the processor 321. As used herein, memory includes any computer readable medium (as defined herein below) configured to store data, code, or other information. The memory may include volatile memory, such as volatile Random Access Memory (RAM) including a cache area for the temporary storage of data. The memory may also include non-volatile memory, which can be embedded and/or may be removable. The non-volatile memory can additionally or alternatively include an electrically erasable programmable read-only memory (EEPROM), flash memory or the like. The virtual ambassador 210 program may be stored within the memory 331 of the interface computing system 110. When executed, the virtual ambassador 210 may be presented on a user interface 341 to the user 170, where the user interface 341 may be a display such as a screen or monitor, or may be a three-dimensional holographic image that is projected within the space of the virtual center.

The operations computing system 120 may comprise a communication interface 312, a processor 322, and a memory 332 having a historical database 324 stored thereon. The historical database 324 may comprise data associated with each user 170 associated with the entity. For instance, the data may relate to customers of the entity, where the entity may be a financial institution. The data may include information regarding accounts of the user 170, actions taken by the user 170 within both the virtual center and the entity's systems at large, number of previous visits and purpose of said visits to the virtual center, and the like. The data within the historical database 352 may, through a data analytics engine, be used to predict a future action of the user 170. The virtual ambassador 210 may be configured to present the predicted future action to the user 170 and inquire whether the user 170 wishes to proceed with the action. The memory 332 may further comprise an operations application 342, which contains executable code for performing the various desired functions of the user 170 as well as the functions of the virtual center. It should be noted that one skilled in the art should recognize that though the interface computing system 110 and the operations computing system 120 as described herein are depicted as two separate systems, the functions of both systems may be performed by a single system or distributed amongst a plurality of systems.

The representative computing system 100 typically also includes a processor 323 operatively coupled to a communication interface 313 and a memory 333. The memory 333 may contain a representative application 353 which causes the processor 323 to display a user interface 343 to a representative 370. It should be understood that the display on which the user interface 343 is presented may include an integrated display (e.g. a tablet or smartphone screen) within the user computing system 100, or an external display device (e.g. a computer monitor or television). The representative application 353 may comprise the application code needed for the representative 370 to assist the user 170 in accomplishing the user's 170 objectives. The application code may include code necessary to connect to a video conferencing session initiated by the virtual ambassador 210 and/or the operations application 342.

FIG. 5 illustrates a process flow of the virtual ambassador system within the virtual center, in accordance with one embodiment of the present invention. The process begins at block 500, where the interface computing system detects a presence of a user within the virtual center. Typically, the system detects the user's presence via one or more sensors and/or cameras placed throughout the virtual center. Once the user walks across an area of detection within the virtual center, the sensors and/or cameras may activate the process. In some embodiments, the cameras and sensors may continuously track the user's movement and position during the user's visit to the virtual center. At this step, the system may begin running passive authentication methods to identify the user as the user walks into the virtual center.

The process continues to block 501, where the system presents an image of a virtual ambassador to the user via a display. In some embodiments, said display may be a two-dimensional display such as a monitor or screen. In other embodiments, the display may be a three-dimensional holographic projection created by a series of holographic projectors. The virtual ambassador may be configured to greet the user with an audio cue, such as greeting the user by the user's name. In some embodiments, the system may, using the historical database, predict the reason for the user's visit. For instance, if the user regularly visits the virtual center and/or the entity's other premises for a particular transaction at a particular time, the system may determine that the user is likely to have visited the virtual center for said transaction if the user visits during the expected time frame. In such a scenario, the virtual ambassador may query the user, typically in audible form, to determine whether the user has visited the virtual center for the predicted purpose. The user may then give an audible confirmation or rejection of the suggested transaction, in response to which the system will respond appropriately by initiating the transaction or by proceeding to the next step (e.g. block 502). In some embodiments, the virtual ambassador may be configured to notify the user of problems associated with the user's account. For instance, if the system detects unauthorized activity on the account, the virtual ambassador may first alert the user to the activity and propose an appropriate series of steps to resolve the problem.

The process continues to block 502, where the system presents to the user an options menu through the virtual ambassador. The options menu may comprise one or more selectable menu items for the user to select depending on the user's objectives. In some embodiments, for instance, the user may wish to take an action related to an account of the user, such as a resource transfer such as a withdrawal or deposit, change in biographical data, account preferences, and the like. The options menu may be presented to the user via a display which may be configured to accept inputs through various methods, which may include touchscreen input, keyboard/keypad input, voice commands, and/or user motion/body detection where the menu is centered around an image of the user on a display. In some embodiments, the menu items within the options menu may be presented to the user via a three-dimensional holographic display within reach of the user.

The process continues to block 503, where the system receives from the user a selection of a menu item. The user may select a menu item which corresponds to the user's needs (e.g. the user wishes to obtain more information about a service offered by the entity) through the approved input methods of the system as described above. Typically, said input occurs through a "touchless" method such as voice commands, user movements/location, and the like. For instance, the user may provide inputs to the system by hovering and/or touching a menu item that has been projected either on a screen or by hologram in close proximity to the user. In other embodiments, the user may state a selection by voice. For instance, if the menu item reads "Account Transfers," the user may select the menu item by speaking the words associated with the menu item. In some embodiments, the user may speak generally about the user's needs, such as by saying "I would like to open a new account." In such embodiments, the system may recognize the words spoken and initiate the processes to accomplish the user's objective, regardless of whether a menu item has been presented to the user.

The process continues to block 504, where the interface computing system sends the selection of the menu item to the operations application within the operations computing system. The selection of the menu item by the user may be sent via the network within the virtual center. In some embodiments, the selection of the menu item may further be sent to another computing system within the entity system in the event that the particular menu item requires additional assistance and/or resources outside of the virtual center.

The process continues to block 505, where the operations computing system receives the selection of the menu item from the virtual ambassador. At this point, the operations computing system and the interface computing system may act in a concerted effort to further the user's objectives. For instance, the operations computing system may determine that an offsite server must be accessed to complete the user's objectives, such as if the user wishes to open a new account. In such an embodiment, the operations computing system may establish a secure communication link with the offsite server and initiate the process. The operations computing system may further detect that further input is required from the user to complete the transaction. In such an embodiment, the operations computing system may trigger the virtual ambassador to prompt the user to provide further input. The input in such a scenario may be biographical information, additional authentication credentials, user preferences, and the like.

The process concludes at block 506, where the operations computing system initiates a resolution of the selection of the menu item. In some embodiments, the operations computing system may determine that the selection of the menu item may be resolved completely within the virtual center. For instance, if the user wishes to transfer account resources such as funds, the system may be configured to allow the user to navigate through the tree of menu choices provided to the user via the display and present the outcome of the transfer to the user through said display. Preferably, the user provides inputs through touchless methods. Upon such a determination, the operations computing system may take all necessary steps to resolve the user's selection, such as providing information to the user, providing confirmation of a change in account preferences, directing the user towards a particular area or device within the virtual center to execute a resource transfer (e.g. withdrawal or deposit). In some embodiments, the operations computing system may determine that resolving the selection must involve other systems and/or representatives within the entity system. At this point, the operations computing system may open communication channels with said other systems to accomplish the objectives of the user.

FIG. 6 is a process flow diagram illustrating a method for using passive-based authentication to authorize transactions, in accordance with one embodiment of the present invention. The process begins at block 600, wherein the system detects a presence of a user within a virtual center. Typically, the system detects the user's presence via a one or more sensors and/or cameras positioned throughout the virtual center. For instance, the sensors and/or cameras may be activated based on motion, light, heat signatures, pressure, sound, and the like.

The process continues to block 601, where the system attempts to verify an identity of the user using a first passive authentication method. The system will typically use at least one passive authentication method (i.e. authentication requiring no active input from the user) to identify a user. For instance, upon detecting the user's presence, the system may attempt to identify a user by using facial recognition. In some embodiments, the system will attempt to use a number of passive authentication methods in parallel. To illustrate, the system may simultaneously attempt to verify the identity of the user using facial recognition, wirelessly detecting the presence of a card issued by an entity, the presence of a token located on the user's smart device, and the like. In some embodiments, the system may be configured to attempt to use all available passive methods to authenticate the user.

The process continues to block 602, where the system increases a confidence value associated with the identity of the user by a predetermined amount associated with the first passive authentication method. Typically, the confidence value associated with the identity of the user represents the degree to which a system is certain regarding a particular user's identity. Successful execution of a passive authentication method may increase the confidence value by a predetermined amount. Generally, each passive authentication method will increase the confidence value by a different amount according to the accuracy and consistency of the particular authentication method. Passive authentication methods that are more accurate and reliable may increase the confidence value by a greater amount, while less accurate and reliable methods may increase the confidence value by a smaller amount. For instance, to the extent that cards issued by the entity may be used by individuals other than the authorized user (e.g. if the entity card is compromised or lost), passive authentication via wirelessly detecting an entity card may increase the confidence value by a smaller amount than facial recognition because the face is unique to the individual. On the other hand, facial recognition may be subject to interference due to artifacts or obstructions within the image captured by the one or more cameras within the virtual center. Accordingly, the system may increase the confidence value by a higher amount if both facial recognition and wireless card authentication compared to the sum of the increases in the confidence value if either passive authentication method was used by itself. To this end, the system may assign a multiplier greater than 1 if two or more passive authentication methods are successful. The multiplier may increase as more passive authentication methods are used successfully.

The process continues to block 603, where the system detects that the confidence value associated with the identity of the user has met or exceeded a first threshold. In some embodiments, the first threshold may be met or exceeded by one passive authentication method. In other embodiments, the first threshold may only be met or exceeded by combining multiple passive authentication methods. The first threshold may be set according to the types of actions to be made available to the user. In particular, the first threshold may correspond to actions requiring a lower level of certainty regarding the identity of the user (e.g. actions that are less sensitive), such as viewing an account balance, making small account transfers, and the like. Furthermore, any number of additional thresholds may be added in addition to the first threshold, where higher thresholds must be met or exceeded by increasing the confidence value over the higher thresholds. The higher thresholds may be associated with actions that require the strictest security (e.g. the highest confidence values), such as making large account transfers, signing up for certain services offered by the entity, significant changes to account settings or identifying information, and the like. Typically, the system may be configured to set the confidence value thresholds such that the highest threshold may be met or exceeded using passive authentication methods alone. In this way, the efficiency of the authentication system is increased by bypassing the active authentication step that is present in traditional methods. In other embodiments, the system may be configured to require the user to provide authentication credentials (i.e. active authentication methods) in order to access the most sensitive account functions. In some embodiments, the predetermined confidence values associated with the various thresholds may be determined by the entity based on a balance between security and expediency. One on hand, setting confidence value thresholds too low may lead to an increased probability of giving an unauthorized user access to various sensitive functions related to the original user's account. On the other hand, setting confidence value thresholds too high may reduce the expediency of the transactions by requiring the user to manually authenticate with the system. Preferably, the predetermined values associated with each passive authentication method will be selected to provide a high level of security while simultaneously increasing the ease and convenience of authenticating the user.

The process continues to block 604, where the system authorizes a first set of actions based on the confidence value meeting or exceeding the first threshold. At this stage, the system may allow certain actions to be conducted by the user. Typically, the actions allowed associated with the first threshold will be actions that carry relatively mild consequences regarding the security of the user. For instance, the threshold for greeting the user by name may be relatively low compared to other functions, as a misidentification of the user in such a case produces comparatively little harm. Based on meeting the first threshold, the system may also allow the user to view an account balance or make small withdrawals or deposits. The actions associated with a second threshold may correspond to actions that require greater security, such as changes to account settings, more significant account transfers, and the like. Actions associated with any further additional thresholds may correspond actions requiring an increasingly greater amount of security. The confidence value must be increased to meet or exceed each of these thresholds in order for the system to authorize the sets of actions which correspond to each threshold. Typically, the system may use only passive authentication methods to increase the confidence value. In this way, the system is able to provide an efficient, seamless, and secure method of authenticating a user with minimal input from the user. In other embodiments, the system may use a combination of passive and active authentication methods to balance efficiency with providing the maximum amount of security possible for a user's account.

The process concludes at block 605, where the system presents to the user a first menu of actions, wherein the first menu of actions comprises the first set of actions. The system provides said first menu to the user via a display. The user may, through the various input methods as described herein, select from the set of first actions that were authorized by the system through the passive authentication methods necessary to meet or exceed the first threshold. In some embodiments, the first menu may further comprise a second set of actions corresponding to a second threshold. In some embodiments, the system may utilize additional passive authentication methods to increase the confidence value above the second threshold once the user selects from the second set of actions. In other embodiments, the system may utilize the additional authentication methods automatically and simultaneously, and provide a menu comprising the sum of total actions available to the user based on the confidence value calculated from successful authentications. Typically, the user may provide input to the system by touching a menu item that has been projected in close proximity to the user. Alternatively, the user may give a voice command to the virtual ambassador to select a provided menu item. In some embodiments, the system may further be configured to, using the historical database, predict the reason for the user's visit. In such embodiments, once the system has verified the user's identity using the various passive authentication methods, the system may inquire whether the user has visited the virtual center to execute a predicted transaction. Once the user provides a confirmation that the user wishes to execute the predicted transaction, the system may automatically begin the process of executing the predicted transaction according to the authentication data received passively from the user, so long as the confidence value has met or exceeded the threshold associated with the predicted transaction.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| Docket Number | U.S. patent application Ser. No. | Title | Filed On |
|---|---|---|---|
| 7854US1.014033.3031 | 15/628,068, now U.S. Pat. No. 10,360,733 | SYSTEM CONTROLLED AUGMENTED RESOURCE FACILITY | Jun. 20, 2017 |

What is claimed is:

1. A system for authenticating a user within a virtual center by using passive authentication, comprising:
    an interface computing system comprising:
        a processor;
        a communication interface; and
        a memory having a virtual ambassador application stored therein, wherein the virtual ambassador application, when executed by the processor, causes the processor to:
            attempt to verify an identity of a user using a first passive authentication method;
            increase a confidence value associated with the identity of the user by a predetermined amount associated with the first passive authentication method;
            detect that the confidence value associated with the identity of the user has met or exceeded a first threshold;
            configure a virtual ambassador to greet the user by name, wherein the virtual ambassador is projected as a three-dimensional holographic image within a field of vision of the user, wherein the virtual ambassador remains in the field of vision of the user at all times;
            authorize a first set of actions based on the confidence value meeting or exceeding the first threshold;

present to the user a first menu of actions, wherein the first menu of actions comprises the first set of actions;

predict, using a historical database associated with the user, that the user has visited a virtual center to execute a transaction;

prompt the user to verify that the user has visited the virtual center to execute the transaction;

receive, from the user, a confirmation that the user has visited the virtual center to execute the transaction;

detect that the transaction is associated with the first threshold;

detect that the transaction is associated with an action within a particular location within the virtual center;

based on detecting that the confidence value has exceeded the first threshold, prompt, via the virtual ambassador, the user to follow the virtual ambassador to move to the particular location; and configure the virtual ambassador to walk together with the user to the particular location, wherein the virtual ambassador remains within a predetermined distance from the user.

2. The system according to claim 1, wherein the virtual ambassador application further causes the processor to:

attempt to verify an identity of the user using a second passive authentication method;

increase the confidence value associated with the identity of the user by a predetermined amount associated with the second passive authentication method;

attempt to verify an identity of the user using a third passive authentication method;

increase the confidence value associated with the identity of the user by a predetermined amount associated with the third passive authentication method;

detect that the confidence value associated with the identity of the user has met or exceeded a second threshold;

authorize a second set of actions based on the confidence value meeting or exceeding the second threshold; and present to the user a second menu of actions, wherein the second menu of actions comprises the second set of actions.

3. The system according to claim 2, wherein the virtual ambassador application further causes the processor to:

integrate the first set of actions and the second set of actions; and present to the user a combined menu of actions, wherein the combined menu of actions comprises the first set of actions and the second set of actions.

4. The system according to claim 1, wherein the first passive authentication method is facial recognition.

5. The system according to claim 2, wherein the second passive authentication method is wireless detection of an entity-issued card, wherein the third passive authentication method is voice recognition.

6. The system according to claim 1, wherein the virtual ambassador application further causes the processor to:

detect that the confidence value has not met or exceeded a third threshold;

initiate an active authentication method; and prompt the user to provide authentication credentials.

7. A computer program product for authenticating a user within a virtual center by using passive authentication, the computer program product comprising at least one non-transitory computer readable medium having computer-readable program code portions embodied therein, the computer-readable program code portions comprising:

an executable portion for attempting to verify an identity of a user using a first passive authentication method;

an executable portion for increasing a confidence value associated with the identity of the user by a predetermined amount associated with the first passive authentication method;

an executable portion for detecting that the confidence value associated with the identity of the user has met or exceeded a first threshold;

an executable portion for configuring a virtual ambassador to greet the user by name, wherein the virtual ambassador is projected as a three-dimensional holographic image within a field of vision of the user, wherein the virtual ambassador remains in the field of vision of the user at all times;

an executable portion for authorizing a first set of actions based on the confidence value meeting or exceeding the first threshold;

an executable portion for presenting to the user a first menu of actions, wherein the first menu of actions comprises the first set of actions;

an executable portion for predicting, using a historical database associated with the user, that the user has visited the virtual center to execute a transaction;

an executable portion for prompting the user to verify that the user has visited the virtual center to execute the transaction;

an executable portion for receiving, from the user, a confirmation that the user has visited a virtual center to execute the transaction;

an executable portion for detecting that the transaction is associated with the first threshold;

an executable portion for detecting that the transaction is associated with an action within a particular location within the virtual center;

an executable portion for, based on detecting that the confidence value has exceeded the first threshold, prompting, via the virtual ambassador, the user to follow the virtual ambassador to move to the particular location; and an executable portion for configuring the virtual ambassador to walk together with the user to the particular location, wherein the virtual ambassador remains within a predetermined distance from the user.

8. The computer program product according to claim 7, the computer-readable program code portions further comprising:

an executable portion for attempting to verify an identity of the user using a second passive authentication method;

an executable portion for increasing the confidence value associated with the identity of the user by a predetermined amount associated with the second passive authentication method;

an executable portion for attempting to verify an identity of the user using a third passive authentication method;

an executable portion for increasing the confidence value associated with the identity of the user by a predetermined amount associated with the third passive authentication method;

an executable portion for detecting that the confidence value associated with the identity of the user has met or exceeded a second threshold;

an executable portion for authorizing a second set of actions based on the confidence value meeting or exceeding the second threshold; and an executable portion for presenting to the user a second menu of actions, wherein the second menu of actions comprises the second set of actions.

9. The computer program product according to claim 8, the computer-readable program code portions further comprising:

an executable portion for integrating the first set of actions and the second set of actions; and an executable portion for presenting to the user a combined menu of actions, wherein the combined menu of actions comprises the first set of actions and the second set of actions.

10. The computer program product according to claim 7, wherein the first passive authentication method is facial recognition.

11. The computer program product according to claim 8, wherein the second passive authentication method is wireless detection of an entity-issued card, wherein the third passive authentication method is voice recognition.

12. The computer program product according to claim 7, the computer-readable program code portions further comprising:

an executable portion for detecting that the confidence value has not met or exceeded a third threshold;

an executable portion for initiating an active authentication method; and an executable portion for prompting the user to provide authentication credentials.

13. A computer-implemented method for interfacing with a user within a virtual center, said method comprising:

attempting to verify an identity of a user using a first passive authentication method;

increasing a confidence value associated with the identity of the user by a predetermined amount associated with the first passive authentication method;

detecting that the confidence value associated with the identity of the user has met or exceeded a first threshold;

configuring a virtual ambassador to greet the user by name, wherein the virtual ambassador is projected as a three-dimensional holographic image within a field of vision of the user, wherein the virtual ambassador remains in the field of vision of the user at all times;

authorizing a first set of actions based on the confidence value meeting or exceeding the first threshold;

presenting to the user a first menu of actions, wherein the first menu of actions comprises the first set of actions;

predicting, using a historical database associated with the user, that the user has visited a virtual center to execute a transaction;

prompting the user to verify that the user has visited the virtual center to execute the transaction;

receiving, from the user, a confirmation that the user has visited the virtual center to execute the transaction;

detecting that the transaction is associated with the first threshold;

detecting that the transaction is associated with an action within a particular location within the virtual center;

based on detecting that the confidence value has exceeded the first threshold, prompting, via the virtual ambassador, the user to follow the virtual ambassador to move to the particular location; and configuring the virtual ambassador to walk together with the user to the particular location, wherein the virtual ambassador remains within a predetermined distance from the user.

14. The computer-implemented method according to claim 13, the method further comprising:

attempting to verify an identity of the user using a second passive authentication method;

increasing the confidence value associated with the identity of the user by a predetermined amount associated with the second passive authentication method;

attempting to verify an identity of the user using a third passive authentication method;

increasing the confidence value associated with the identity of the user by a predetermined amount associated with the third passive authentication method;

detecting that the confidence value associated with the identity of the user has met or exceeded a second threshold;

authorizing a second set of actions based on the confidence value meeting or exceeding the second threshold; and presenting to the user a second menu of actions, wherein the second menu of actions comprises the second set of actions.

15. The computer-implemented method according to claim 14, the method further comprising:

integrating the first set of actions and the second set of actions; and presenting to the user a combined menu of actions, wherein the combined menu of actions comprises the first set of actions and the second set of actions.

16. The computer-implemented method according to claim 13, wherein the first passive authentication method is facial recognition.

17. The computer-implemented method according to claim 14, wherein the second passive authentication method is wireless detection of an entity-issued card, wherein the third passive authentication method is voice recognition.

18. The computer-implemented method according to claim 13, the method further comprising:

detecting that the confidence value has not met or exceeded a third threshold;

initiating an active authentication method; and prompting the user to provide authentication credentials.

* * * * *